United States Patent [19]

Sasao

[11] Patent Number: 4,509,013
[45] Date of Patent: Apr. 2, 1985

[54] SPEED DETECTING DEVICE
[75] Inventor: Isao Sasao, Inazawa, Japan
[73] Assignee: Mitsubishi Denki Kabushiki Kaisha, Tokyo, Japan
[21] Appl. No.: 442,675
[22] Filed: Nov. 18, 1982
[30] Foreign Application Priority Data Mar. 3, 1982 [JP] Japan .................................. 57-33262

[51] Int. Cl.³ ........................... G01P 3/42; G01P 3/56
[52] U.S. Cl. ................................................... 324/161
[58] Field of Search ............... 307/597, 592, 593, 595, 307/603, 273, 234, 516, 519; 328/111, 112, 120; 377/9; 324/160, 161–166; 318/327, 329, 330, 346

[56] References Cited

U.S. PATENT DOCUMENTS 4,090,181 4/1978 Ansari ............................ 324/161 X
4,180,747 12/1979 Zettler ........................... 307/597 X
4,409,639 10/1983 Wesner ......................... 307/597 X

OTHER PUBLICATIONS

Hitachi: "Chattering Eliminator Circuit for SPST"—Hitachi TTL Catalog—1978—p. 581.

Primary Examiner—Stanley T. Krawczewicz
Assistant Examiner—Jose M. Solis
Attorney, Agent, or Firm—Leydig, Voit, Osann, Mayer and Holt

[57] ABSTRACT

A speed threshold value crossing detecting circuit which receives a pulse each time an object moves a unit distance has a time limit circuit activated by each pulse, a detector circuit determining whether the time limit of time limit circuit is over by the time of each successive pulse to detect whether the moving speed of the object has reached a preset speed, and a time limit control circuit for increasing the time limit of the time limit circuit when the detector circuit indicates that the preset speed has been reached. The hysteresis thus introduced in the time limit makes the detector circuit output turn uniformly on or off and suppresses the effect of small fluctuations in the pulse frequency not indicative of speed variations. Preferably the time limit of a retriggerable one-shot multivibrator is increased by selectively disconnecting an auxiliary resistor from the one-shot's RC time-setting network when the preset speed has been reached.

9 Claims, 6 Drawing Figures

SPEED DETECTING DEVICE

BACKGROUND OF THE INVENTION

1. Field of the Invention

This invention relates to improvements in a device for detecting that the speed of a moving object has reached or crossed a set speed threshold value.

2. Description of the Prior Art

In safety devices for elevators when the speed of an elevator cage reaches a preset speed, the operation of the elevator is suspended to stop the cage. One device for detecting whether or not a set speed threshold value has been reached digitally detects the preset speed by utilizing the combination of a time limit circuit and a detector circuit for analyzing pulses generated at intervals inversely proportional to the speed of the cage.

Such a speed threshold value crossing detecting device has the advantage of having a fast response. However, the detector circuit's output unnecessarily repeats signals as a function of the rate of the input pulses which in turn depends on the machining precision of the disc and the electrical characteristics of the pulse generator, etc. Usually, several devices are controlled by the detector circuit's output, and fluctuations in said output results in poor speed control. For example, in the case of performing a braking control, a brake is repeatedly turned "on" and "off", which does not allow for smooth braking control as well as shortening the lifetime thereof.

SUMMARY OF THE INVENTION

The principal object of the invention is to provide a speed threshold value crossing detecting device which gives a uniformly "on" or a uniformly "off" output or braking control when the detected speed value approximates the set speed threshold value.

Another object of the invention is to provide smooth braking control and to prolong the life of speed braking devices.

Still another object of the invention is to provide a detecting device, working in conjunction with a speed indicating pulse generator, that tolerates and substantially ignores relatively small fluctuations in the pulse generator frequency not indicative of speed variations.

A specific object of the invention is to provide a pulse receiving detecting device in which the time limit of a time limit circuit is changed in accordance with the output of a detector circuit, thereby preventing the fluctuations of the output of the detector circuit attributed to relatively small variations in the frequency of the input pulses.

More specifically, this invention provides a detecting device wherein a time limit circuit is driven by pulses generated according to the movement of an object. When the next pulse arrives, whether or not the time limit of the time limit circuit is over, it is detected by a detector circuit and unless the time limit is over, it is decided that the speed of the object has reached a preset speed. In accordance with the output of the detector circuit, the time limit of the time limit circuit is made longer when the speed of the object has reached the set speed, than when it has not.

Thus, fluctuations in the detector circuit's output due to variations in the rate of input pulse intervals can be prevented, and a stable speed detection can be achieved.

Figure 1:
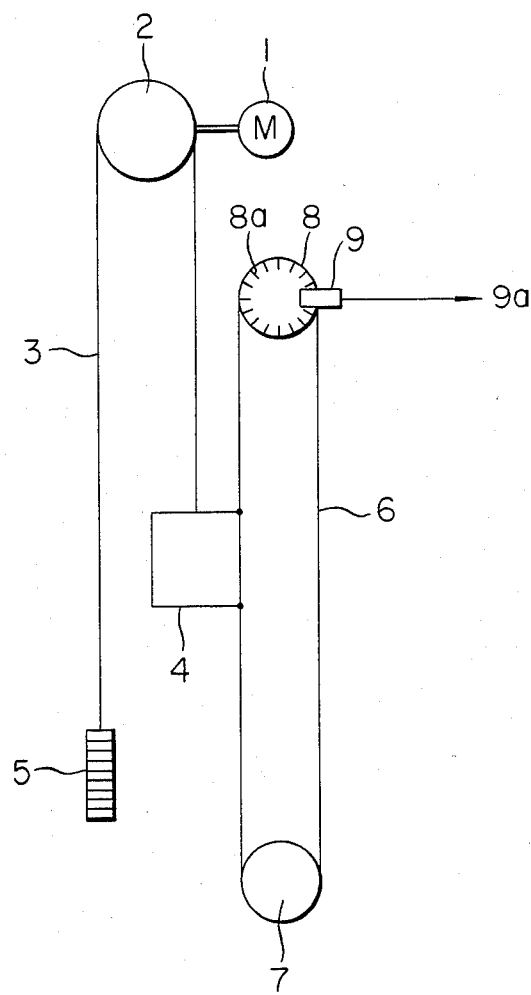
FIG. 1 is a view of an arrangement in which a speed detecting device is applied to an elevator.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

DESCRIPTION OF THE PREFERRED EMBODIMENT

The preferred mechanical components for adapting an elevator to use the present invention are shown in FIG. 1. A hoist motor 1 drives a winder sheave 2. A main rope 3 is wrapped around the sheave 2. An elevator cage 4 disposed within an elevator shaft is coupled to one end of the main rope 3, while a counter-balance weight 5 is coupled to the other end thereof. An auxiliary rope 6 placed within the elevator shaft has both of its ends coupled to the cage 4 in a manner to form an endless loop. A tensioning pulley 7 is disposed in the lower part of the elevator shaft, and applies a downward tension to the rope 6. A disc 8 provided with slits 8a in its peripheral edge at equal intervals is disposed in a machinery room and is driven by the rope 6. A pulse generator 9 is disposed in opposition to a peripheral edge portion of the disc 8, and generates a pulse 9a each time one of the slits 8a is rotated to the peripheral edge portion.

Figure 2:
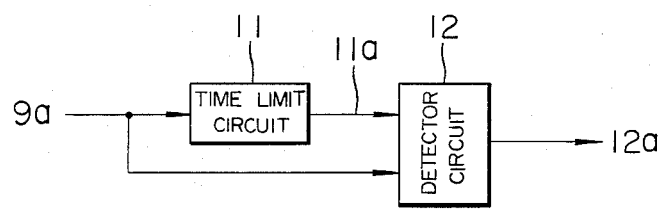
FIG. 2, labelled PRIOR ART, is a block circuit diagram of a prior art speed detecting device.

FIG. 2 shows a prior art device adapted to receive input pulses 9a from the pulse generator 9. Referring to the figure, a time limit circuit 11 receives a pulse 9a every unit distance of movement of the cage. The pulse 9a is transmitted from the pulse generator which produces an output signal each time it detects a slit on the disc having the slits on its peripheral edge which rotates with the movement of the elevator cage. Accordingly, the time interval between the pulses 9a is inversely proportional to the speed of the cage.

Figure 3:
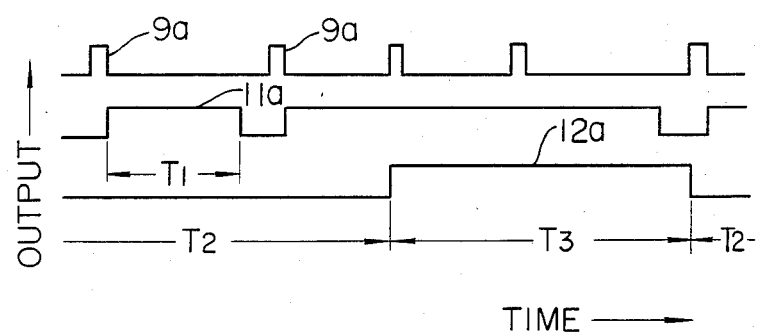
FIG. 3, labelled PRIOR ART, illustrates the logic waveforms generated in the device in FIG. 2.

FIG. 3 illustrates the logic waveforms into and out of the time limit circuit 11 and the detector circuit 12 of FIG. 2. As seen from the waveforms, when the input pulse 9a goes "L" (low level), the output 11a of the time limit circuit 11 goes "H" (high level) for a time limit or period of time $T_1$ corresponding to the preset speed. Should the next pulse 9a occur during the time $T_1$, the output 11a stays "H" and is further extended for the period of time $T_1$. If the time limit circuit's output 11a is "L" when the pulse 9a goes high (if the time limit is over), the output 12a of the detector circuit 12 stays "L", which implies that the cage has not yet reached the preset speed. On the other hand, if the time limit circuit output 11a is "H" when the next pulse 9a goes high (if the time limit is not over), the detector circuit's output 12a goes "H", indicating that the cage is at or above the set speed. T₂ designates the period of time during which the output 12a indicates that the set speed has not been reached, while T₃ designates the period of time during which the output 12a indicates that the set speed has been reached.

Figure 4:
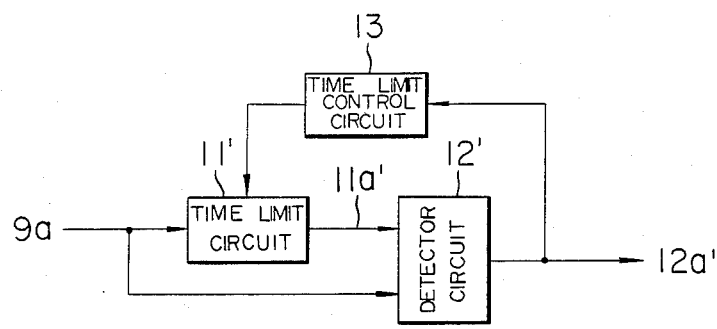
FIG. 4 is a block circuit diagram showing an embodiment of a speed detecting device according to the present invention.

Now referring to FIG. 4 which is illustrative of an embodiment of the present invention, the combination of circuits shown therein is adapted to receive input pulses 9a from a pulse generator 9 in accordance with the speed of the elevator cage (FIG. 1). In carrying out this invention, a retriggerable monostable time limit circuit 11' is used having a monostable circuit with an output 11a' which becomes active or inverted to a "H" (high level) for a predetermined time limit or period of time $T_1$ in response to each input pulse 9a. A detector circuit 12' is used which includes a D-type flip-flop and which provides a detection output 12a'. Upon receiving consecutive pulses which caused the output of the time limit circuit to go high, whether or not the time limit of the time limit circuit is over, the detector circuit 12' generates a detection signal on its output 12a' indicating whether or not the elevator cage 4 has reached a preset speed threshold value. A time limit control circuit 13 lengthens automatically varies the threshold value by lengthening the time limit $T_1$ of the time limit circuit 11' when the speed of the cage 4 has reached the set speed. A specific embodiment of such a device is as shown in FIG. 5.

Figure 5:
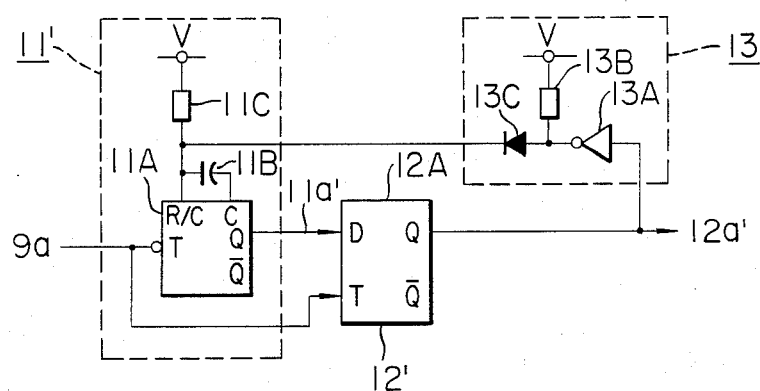
FIG. 5 is a detailed diagram corresponding to FIG. 4.

In FIG. 5, the letter V indicates a positive D.C. voltage source. A retriggerable one-shot multivibrator or monostable element 11A accepts the input pulses 9a on its trigger input T, and is triggered by the negative, trailing, or falling edge of the trigger input signal (e.g., RCA Corp. part no. CD4098B, National Semiconductor Corp. part No. DM96/DM8601). A capacitor 11B is connected between the terminals R/C and C of the monostable element 11A, and a resistor 11C is connected between the voltage source V and the capacitor 11B. The resistor 11C and capacitor 11B together are a time-setting network having a resistance and a capacitance for determining the time limit of the monostable element 11A. An open collector type inverter 13A is connected to the terminal Q of a leading or rising edge-fired D flip-flop 12A which comprises the detector circuit 12'. Of course, a discrete NPN transistor having its emitter grounded, its collector as an output, and its base in series with an appropriate input resistor network may perform the inverter function. The D flip-flop 12A receives the time limit circuit output 11a' on its D input and receives the pulses 9a on its clock or toggle input T. A resistor 13B is connected between the positive voltage source V and the output of the inverter 13A, and a diode 13C is connected between the resistor 13B and the resistor 11C.

Ignoring the effect of the time limit control circuit, the time limit $T_1$ of the monostable element 11A is generally proportional to the resistance R of the resistor 11C and the capacitance C of the capacitor 11B according to $T_1=(K)(C)(R)$, where K is a constant.

Figure 6:
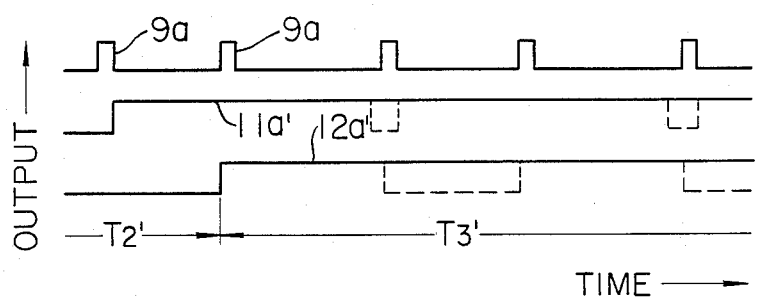
FIG. 6 illustrates the logic waveforms generated in the device in FIG. 5.

When the cage 4 is driven up or down by means of the motor 1, the disc 8 is rotated by the rope 6. Thus, the pulse generator 9 generates a pulse 9a each time the cage 4 moves a unit distance, as illustrated in FIG. 6.

Thus, the time interval of the pulses 9a is inversely proportional to the speed of the cage 4.

When the speed of the cage 4 is below the set speed, the detector circuit's output 12a' becomes "L". At this time, the output of the inverter 13A is at a high impedance, so that the resistor 13B is connected in parallel with the resistor 11C through the diode 13C. On the other hand, when the speed of the cage 4 is equal to or higher than the set speed, the detector circuit's output 12a' becomes "H". Since the diode 13C is reverse-biased by this output, the resistor 13B is not connected in parallel with the resistor 11C. In other words, the time limit control circuit changes the time limit by applying a resistance changing signal to the resistor 11D making up the time-setting network 11B, 11C, thereby changing the net resistance of the time-setting network. As a result, the time limit in the case where the set speed is reached becomes longer than that in the case where the set speed is not reached. Therefore, the detection output 12a' maintains "H" as shown in FIG. 6, and relatively small deviations in the input pulses 9a do not affect the detection output 12a'. Waveforms indicated by broken lines in FIG. 6 correspond to the case of the prior art circuit. When the speed of the cage 4 has thereafter become substantially lower than the set speed (the interval between input pulses 9a being longer), the time limit circuit's output 11a' becomes "L", and also the detection output 12a' becomes "L".

Thus it is understood that the diode 13C and open-collector inverter 13A function as an analog switch to selectively disconnect an additional resistor 13B in parallel with the time limit setting resistor 11C so that the time limit T1 of the time limit curicut 11' is increased when the period of the input pulses falls below the initial time limit. This hysteresis effect provides the speed detecting device with a uniformly "on" or a uniformly "off" output when the detected speed approximates the set speed, so that the speed detecting device tolerates and substantially ignores small fluctuations in the pulse generator signal not indicative of speed variations. The relative amount of hysteresis is set by the ratio of the resistance of resistor 11C to the resistance of resistor 13B. Moreover, it will become evident to persons skilled in control electronics that the diode 13C and open collector inverter 13A could be replaced by an analog switch integrated circuit (e.g., RCA Corp. CD4016). Alternatively, analog switches could selectively add an additional capacitor in parallel to the capacitor 11B to increase the time limit $T_1$ of the time limit circuit 11'.

Although the present invention has been described in relation to control of an elevator, the present invention is extensively applicable to moving objects such as a streetcar.

What is claimed is:

1. For comparing the speed of an object relative to an automatically variable threshold value on the basis of a pulse generated each time said object moves a unit distance, a speed threshold value crossing device comprising:

a time limit circuit means for providing an output signal active for a predetermined period of time in response to said generated pulses, so that said predetermined period of time is the time limit of the time limit circuit means;

a detector circuit means supplied with the output signal of said time limit circuit means and said generated pulses, for detecting, upon receiving consecutive pulses which caused the output of said time limit circuit means to be active, whether or not the time limit of said time limit circuit means is over, and thereupon generating a detection signal indicating whether or not said object has reached a preset speed threshold value corresponding to the time limit; and a time limit control circuit means, receiving the detection signal from said detector circuit means, for automatically varying the threshold value from the preset value by lengthening the time limit of said time limit circuit means upon receiving said detection signal indicating that the object speed has reached the preset speed threshold value.

2. A speed threshold value crossing detecting device as claimed in claim 1, further comprising means for generating said pulses, said means comprising:

a disc which rotates with the movement of said object and which has slits at equal intervals in its peripheral edge, and pulse generator means arranged in opposition to a peripheral edge portion of said disc for generating a pulse each time one of the slits is rotated to the peripheral edge portion.

3. A speed threshold value crossing detecting device as claimed in claim 1, wherein:

said detector circuit means comprises a flip-flop which receives the output signal of said time limit circuit means and said pulses.

4. A speed threshold value crossing detecting device as claimed in claim 1, wherein:

said time limit circuit means comprises a monostable element whose input terminal is supplied with said pulses and whose output is inverted for a predetermined period of time in response to each of said pulses.

5. A speed threshold value crossing detecting device as claimed in claim 4, wherein:

the time limit of said monostable element is determined by the resistance and capacitance of a timesetting network which comprises a first resistor and a capacitor.

6. A speed threshold value crossing detecting device as claimed in claim 5, wherein:

said time limit control circuit means has means for changing said time limit by applying a signal to the timesetting network means.

7. A speed threshold value crossing detecting device as claimed in claim 6, wherein:

said time limit control means has means for changing the resistance of said time setting network.

8. A speed threshold value crossing detecting device as claimed in claim 6, wherein:

said time limit control means comprises a second resistor, and means for selectively disconnecting said second resistor from the first resistor of said time setting network in response to the detection signal from said detector circuit means, so that the first resistor is disconnected from the second resistor when the detection signal indicates said object has reached said present speed to thereby lengthen said time limit.

9. For comparing the speed of an object relative to an automatically variable threshold value on the basis of a pulse generated each time said object moves a unit distance, speed threshold value crossing detecting device comprising:

time limit and detector means for comparing the time between pulses to a predetermined period of time and generating an output active when the time between pulses is less than said predetermined period of time, thereby indicating whether a speed limit corresponding to the predetermined period of time is reached; and means for selectively increasing said predetermined period of time by a predetermined amount in response to whether said output is active, so that said output does not fluctuate in response to small variations in the time between the pulses when the speed limit is reached.

* * * * *